United States Patent

[11] 3,585,595

[72] Inventors Martin J. Slavin
 Huntington;
 Kenneth Cohen, Smithtown; Morton
 Pullman, East Northport, all of, N.Y.
[21] Appl. No. 855,527
[22] Filed Sept. 5, 1969
[45] Patented June 15, 1971
[73] Assignee Instrument Systems Corporation
 Huntington, N.Y.

[54] CLOSED LOOP CONTROL SYSTEM HAVING
 SERIES CONNECTED CODERS
 15 Claims, 4 Drawing Figs.
[52] U.S. Cl. .................................................. 340/163,
 340/147
[51] Int. Cl. ...................................................... H04q 9/00
[50] Field of Search ........................................ 340/163,
 147

[56] References Cited
 UNITED STATES PATENTS
 3,075,177 1/1963 Derr ............................ 340/163

Primary Examiner—Harold I. Pitts
Attorney—Blum, Moscovitz, Friedman & Kaplan

ABSTRACT: A control system for disposing each of a plurality of utilization circuits in a state responsive to the state of corresponding utilization controls. A plurality of series connected coders detect the state of the utilization controls associated therewith. Decoders associated with each of said coders and in series connection in the same sequence as said corresponding coders control the state of the corresponding utilization circuits. A column timer is in series connection with said coders and decoders for applying control signals thereto. Each of said coders and decoders are sequentially activated to a first active state during which they are operative to perform their assigned functions. Thereafter, each activated coder and decoder assumes an inactive state in which they permit the passage of control signals and data therethrough. Said control signals can be applied in either direction along said series connections.

CLOSED LOOP CONTROL SYSTEM HAVING SERIES CONNECTED CODERS

BACKGROUND OF THE INVENTION

This invention relates generally to control systems utilized ro permit the control from a plurality of discrete stations, of a plurality of utilization circuits associated therewith. An example of such a system would be the service system of an aircraft wherein the plurality of stations are the seat locations therein. Another example of such a system would be a burglar and/or fire alarm system wherein the plurality of stations are the monitoring stations therein. Each seat or group of seats has a number of utilization circuits associated therewith such as service call lights and lamps for reading or general illumination. In the art, it is customary to provide direct wiring between a utilization control, such as a switch at each seat, and the corresponding utilization circuit. This approach results in large amounts of cabling and therefore added expense and weight in the aircraft. Still further cabling and expense is added to the cost of a system if centrally located supervisory utilization circuits, such as a central attendant call light, responsive to the remotely located supervisory control means are to be provided.

As an alternative to direct wiring between the individual utilization controls and corresponding utilization circuits, a system utilizing multiplexing techniques has been proposed wherein a coder is associated with each utilization control for transmitting data to a data line in assigned time slots representative of the state of said utilization control, and a decoder is provided associated with the corresponding utilization circuits for detecting in assigned time frames from said data line said state data and controlling said utilization circuits in response thereto. Said system, in addition to the data line, disposes the coders and decoders, respectively, in series connection for sequential operation. Such a system suffers from the disadvantage that if the data line or series connection breaks, the elements downstream of the break are rendered inoperative. Further, the provision of both series connections and a separate date line adds to the cabling and expense of the system.

SUMMARY OF THE INVENTION

Generally speaking, in accordance with the invention, a closed-loop control system for placing said utilization circuits in a state responsive to the state of corresponding utilization control means is provided. Said system includes a plurality of series connected coder means for detecting the state of the utilization control means associated therewith and decoder means associated with each of said coder means for controlling the state of the corresponding utilization circuits. The decoder means are in series connection in the same sequence as the corresponding coder means. Column timer means is provided in series connection with the plurality of coder means and the plurality of decoder means for applying control signals to said series connections.

The coder and decoder means are sequentially activated in response to the control signals during assigned time slots. Each coder, when first activated during a cycle of said system, assumes an active state during which it transmits in assigned time slots data representative of the state of the utilization control means associated therewith to the column timer means through any of the coder means previously activated during said cycle. Thereafter, for the balance of the cycle, the coder means is in an inactive state during which it passes the control signal and the data transmitted by downstream coder means. The column timer means is adapted to incorporate in the control signal applied to the decoder means, the data representative of said utilization control means states. Each decoder means is adapted, when first activated during a cycle of said system, to assume an active state wherein it receives during assigned time slots said data from said column timer means through any previously activated decoder means to control the corresponding utilization circuits. Thereafter, for the balance of said cycle, each decoder means is placed in an inactive state wherein it passes the control signal to downstream decoder means.

The control signal preferably includes clock timing and synchronization portions. The coder and decoder means are adapted to be reset in response to said synchronization portion to commence a new cycle of the system. The sequential operation of the system is responsive to the clock timing components of said control signal.

The column timer is adapted to apply the control signal in one direction along said series connections during some cycles of said system and in the other direction during other cycles of said system, the coder and decoder means being operative in response to control signals received in either direction. The column timer means may be provided with loop error detector means adapted to detect a characteristic portion of said control signals from the last activated of said series connected coder and decoder means and alarm means connected to said loop error detector means, said loop error detector means being adapted to activate said alarm means upon the failure to detect said characteristic portion of said control signals.

The system may include supervisory utilization control means which produce data representative of the state in which selected utilization circuits are to be placed, said column timer being adapted to apply such data in assigned time slots to the control signal applied to said decoder means in place of the corresponding data from said coder means. Said system may be adapted to permit a utilization control means to be responsive to data from an appropriate supervisory utilization control means, if desired.

Both the coder and decoder means are provided with appropriate gating means responsive to gating and direction signals generated therein to transmit and utilize the control signals applied thereto in order to perform the above-described functions.

Accordingly, it is an object of this invention to provide a close-loop control system which permits individual control of a variety of utilization circuits.

Another object of the invention is to provide a close-loop control system wherein the elements on both sides of a break in said closed loop are operative despite said break.

A further object of the invention is to provide a closed-loop control system adapted to detect breaks in said loops to activate an alarm in response thereto.

Still another object of the invention is to provide control elements adapted for use in series connected arrangements incorporating a plurality of like elements, each of said elements being sequentially operated for the transmission or receipt of data and thereafter, although inactive, permitting the passage of control signals and data therethrough.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
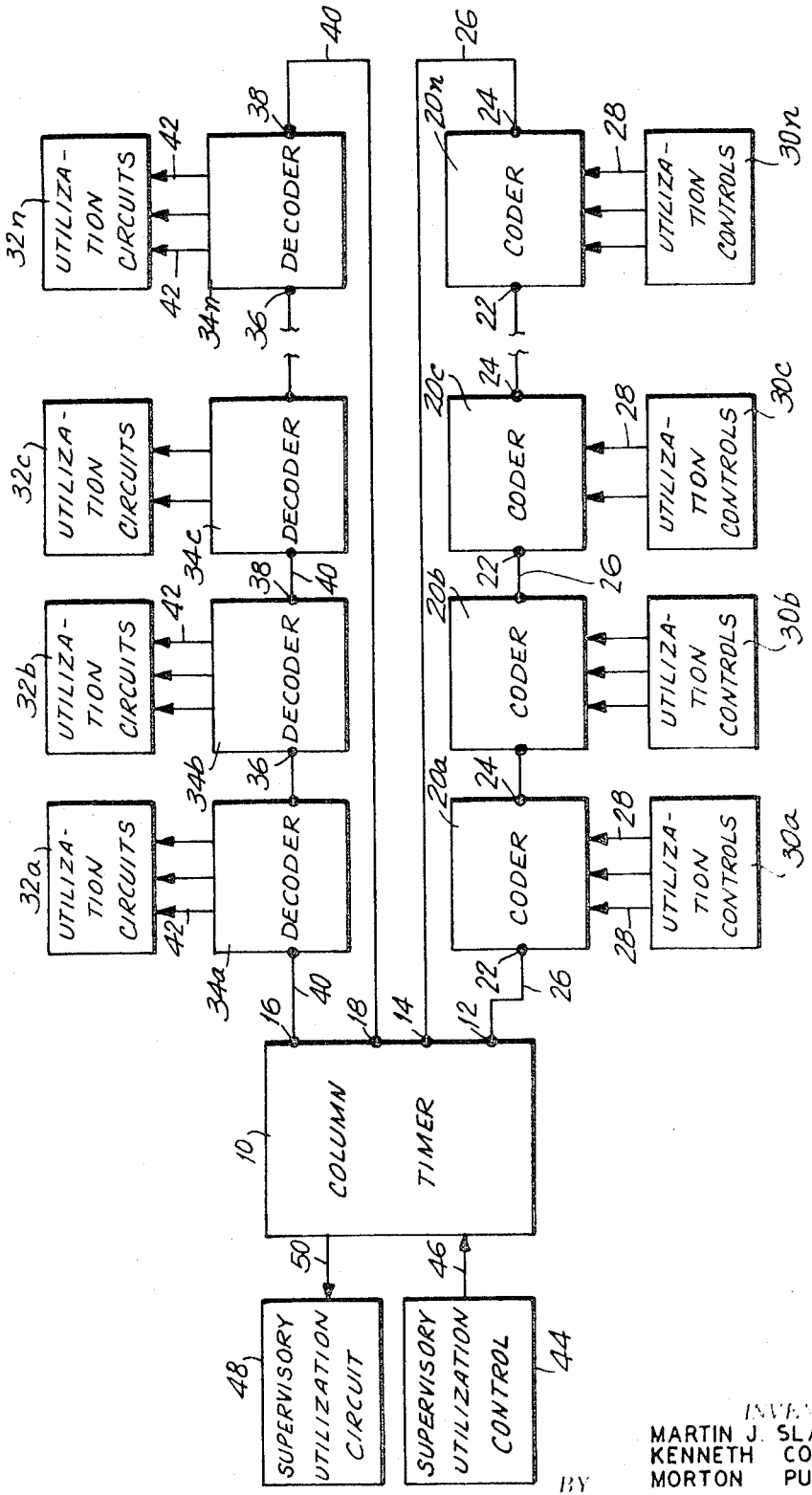
FIG. 1 is a schematic representation of one type of closed-loop control system according to the invention.

Referring now to FIG. 1, the closed-loop control system depicted incorporates a column timer 10 having a pair of coder terminals 12 and 14 and a pair of decoder terminals 16 and 18. Connected in series with said coder terminals are a plurality of coders 20a, b, c, ...,n. Each coder is provided with a pair of terminals 22 and 24 for said series connection, interconnected by coder line 26. Operatively connected to each coder 20, by means of lines 28, are one or more utilization controls 28a, b, c, ... ,n. Each utilization control is adapted to be set in one or more states associated with the states in which the corresponding utilization circuits 32a, b, c, ... ,n are to be placed. Each coder 20 is adapted to detect the states of its corresponding utilization controls 30 and to store data representative of said states.

Connected in series with decoder terminals 16 and 18 of column timer 10 are a plurality of decoders 34a, b, c, ... ,n. Each decoder is provided with a pair of terminals 36 and 38 interconnected in said series connection by decoder line 40. Each decoder 34 is connected, by means of lines 42 to one or a group of utilization circuits 32. Said decoders are adapted to place their corresponding utilization circuits in the desired state in response to data received thereby in assigned time slots.

Each coder 20 is associated with the decoder 34 connected to the utilization circuits 32 which are, in turn, associated with its utilization controls 30. Thus, coder 20b is associated with utilization controls 30b which are adapted to control utilization circuits 32b. Accordingly, decoder 34b is associated with coder 20b. Further, the associated coders and decoders are disposed in their respective series connection in the same sequence. In this manner, when said coders and decoders are sequentially operated, only the corresponding pair of said coders and decoders are activated at any instant.

The closed-loop system according to the invention is adapted for cyclical operation. During each cycle, the column timer 10 applies a control signal to either of decoder terminals 12 and 14. Said control signal includes synchronization and clock timing components in assigned time frames. Further, time frames within said signal are allotted to each element of data which is to be transmitted during the operation of the system. Each cycle of the system is represented by a time frame subdivided into a plurality of said time slots. For example, time slots would be allocated to contain data representative of the states of each of the three utilization controls 30a and each of the two utilization controls 30c. The clock timing components of said control signal can consist, for example, of a series of spaced pulses. The synchronization component of said control signal may consist of a group of time slots during which no pulses are present, said synchronization component being utilized to reset coders 20 and decoders 34 either at the end or beginning of a cycle. Column timer 10 is also adapted to apply a control signal of similar construction to either of decoder terminals 16 and 18.

Assume that in one cycle, column timer 10 applies said control signal to coder terminal 12, all of said coders 20 having been previously reset to a not-yet-activated state in response to the synchronization component during the previous cycle. Said control signal would be detected at terminal 22 of coder 20a to place said coder in an active state which is maintained for a time period consisting of a predetermined number of time slots. During said time period, coder 20a transmits back through terminal 22 thereof, in appropriate time slots, the data representative of the state of utilization controls 30a. At the end of said time period, as determined by the detection of a predetermined number of said clock timing components, coder 28 is placed in an inactive state during which the data stored therein is no longer transmitted, but the control signal passed therethrough, out of terminal 24 and into terminal 22 of coder 20b. Coder 20b is then activated for a predetermined time period and transmits the data representative of the state of utilization controls 30b out of its terminal 22 in the direction of column timer terminal 12. Since coder 20a is in its inactive state, said data is passed therethrough from its terminal 24 to its terminal 20. This sequential operation continues until the nth coder has gone through an active state, at which time a synchronization component of the control signal resets all of coders 20 to dispose said coders in the not-yet-activated state for the next cycle. Each coder, when first activated, receives the control signal from the downstream coders and passes the data back through said downstream coders to column timer 10.

In like manner, column timer 10 will apply a control signal to decoder terminal 16 which first activates decoder 34a. When so activated, said decoder receives in assigned time frames, the data transmitted by coder 20a, said column timer having interposed said data in the control signal applied to decoder terminal 16. In response to said data, decoder 34a places utilization circuits 32a in the desired state. After remaining active for a time period corresponding to the active time period of coder 20a, decoder 34a assumes an inactive state and passes the control signal along decoder line 40 from its terminal 38 to the terminal 36 of decoder 34b. In the embodiment shown in the drawings, decoders 34 do not require the capability of transmitting data back to column timer 10, and need only pass the control signal therethrough during their inactive state.

All of the coders 20 are preferably identical and permit interchangeability and ready maintenance. In like manner, all of the decoders are preferably identical and interchangeable among themselves, the operation of the system being dependent on the placement of a particular coder or decoder in the series connection, rather than the design of a particular one of said coders or decoders.

Column timer 10 is adapted to apply said control signal to coder terminal 12 during some cycles and to coder terminal 14 during other cycles and in like manner to apply said control signal to decoder terminal 16 during some cycles and to decoder terminal 18 during other cycles. When the control signals are applied to terminals 14 and 18 respectively, the system operates in a like manner only the first activated of said coders and decoders are coder 20n and decoder 34n, the remaining coders and decoders being sequentially operated in the manner described above with the data from the respective coders being transmitted back to column timer coder terminal 14. The system is provided with a supervisory control 44 connected to column timer 10 through line 46. Said supervisory control is preferably centrally located and adapted to apply data to column timer 10 during appropriate time slots to govern the state of certain of utilization circuits 32. The column timer is adapted to apply the data from supervisory control 44, if present, in place of the corresponding data from the appropriate coders 20 so that the state of the utilization circuits is determined by the state of supervisory control 44. The system also includes a supervisory utilization circuit 48 connected to column timer 10 by line 50, said column timer being adapted to actuate said supervisory utilization circuit upon detecting certain data in assigned time slots of said control signal.

Figure 2:
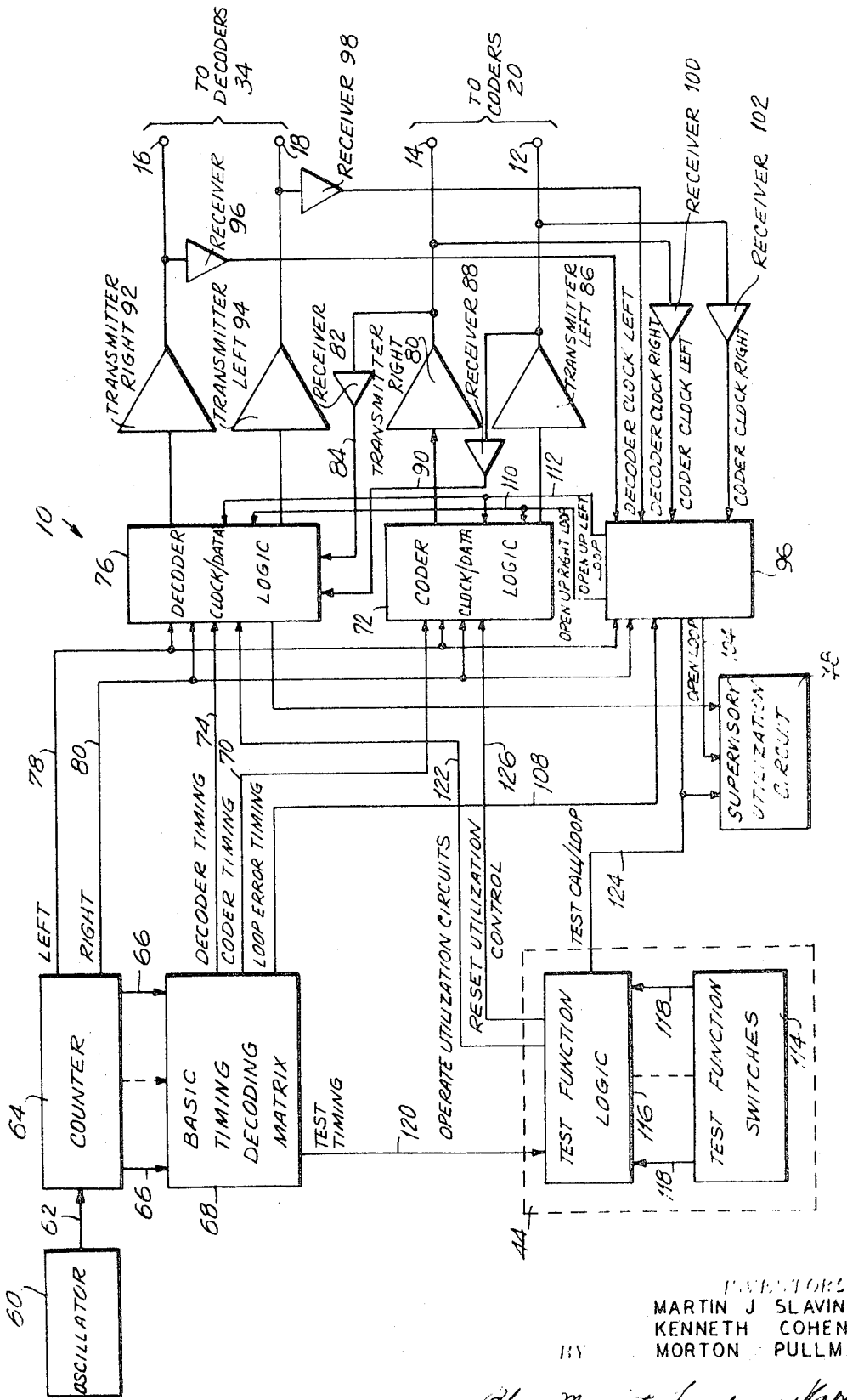
FIG. 2 is a schematic representation of the column timer of the system of FIG. 1.

In order to more particularly understand the operation of the system and further embodiments and features thereof, reference is now had to FIG. 2 which shows a schematic representation of one embodiment of column timer 10 according to the invention. The basic system timing for the closed-loop control system according to the invention is obtained from oscillator 60 which is operatively connected through line 62 to counter 64. Said counter generates the basic timing pulses which govern the operation of the system. Said timing pulses are applied through lines 66 to basic timing decoding matrix 68 which produces, from the pulse output of counter 64 the specific timing pulses required to control the various elements of the system. Thus, coder timing signals are passed along line 70 to coder clock/data logic 72 which assembles and structures the control signal applied to the series connected coders 20. In like manner, decoder timing signals are passed from decoding matrix 68 through line 74 to decoder clock/data logic 76 which is adapted to structure and assemble the control signal applied to the series connected decoders 34, the latter control signal also incorporating the data from coders 20.

Counter 64 also transmits a timing signal which determines the direction along said series connected coders and decoders that said control signals are applied. For purposes of identification, coder terminal 14 and decoder terminal 16 are designated the right terminals while coder terminal 12 and decoder terminal 18 are designated the left terminals. To effect this determination, counter 64 applies "left" timing pulses along line 78 and "right" timing pulses along line 80 to both decoder clock/data logic 76 and coder clock/data logic 72. Said timing pulses are preferably alternately applied along lines 78 and 80 so that the control signals are alternately applied to the respective coder and decoder terminals during consecutive cycles of the system. Thus, during one cycle, coder clock/data logic 72 would apply the control signal through transmitter 80 to coder terminal 14 and the series-connected coders 20. The data transmitted by said coders would be received back at coder terminal 14 and applied to receiver 82 which transmits said data signal along line 84 to decoder clock/data logic 76 for incorporation in the control signal thereof. In the next cycle, coder clock/data logic 72 applies the control signal through transmitter 86 to coder terminal 12 and the return data is received at receiver 88 and passed along line 90 to decoder clock/data logic 76.

In like manner, said decoder clock/data logic alternately transmits its control signal along transmitters 92 and 94 to decoder terminals 16 and 18 respectively.

While the alternate application of control signals to the "right" and "left" terminals is preferred, any combination of application of the control signals thereto may be utilized, so long as the control signal is applied to the "right" terminals during some cycles and to the "left" terminals during other cycles.

In order to detect breaks in the series connections of said coders and decoders, loop error detector 96 is provided. Said loop error detector is connected through receivers 96, 98, 100 and 102 to decoder terminals 16 and 18 and coder terminals 14 and 12 respectively. Said loop error detector is adapted to detect the presence of the clock timing component of the respective control signals at the coder and decoder terminals connected to the last coder and decoder in the series connection. Thus, if the control signal were applied to line 16 and there were no break in the series-connected decoders, loop error detector 96 would detect the clock pulse through receiver 98 which taps off decoder terminal 18. If loop error detector 96 fails to detect such clock timing signals during the appropriate time slots, an activating signal is applied along line 104 to supervisory utilization circuit 48 to activate an alarm means such as a bell or light. Timing signals for said loop error detector are received along line 106 from basic timing decoding matrix 68 while the "right" and "left" timing signals are received from counter 64 along lines 78 and 80.

If desired, loop error detector 96 can be adapted to limit the application of control signals to only left or right terminals, if desired due to the location of the break in the series connection. For this purpose, said loop error detector is connected to decoder clock/data logic 76 and coder clock/data logic 72 by lines 110 and 112 which control the opening of the right and left loops respectively.

The supervisory control 44 may consist of a plurality of manually operated test function switches 114 operatively connected to a test function logic 116 by lines 118 for the test of the system. Timing for supervisory control 44 is obtained along line 120 from basic timing decoding matrix 68. The output from test function logic 116 is taken along 122 to decoder clock/data logic 76 to provide the supervisory data for the control of the various utilization circuits 32, along line 124 to loop error detector 96 and supervisory utilization circuit 48 to test these components, and along line 126 to coder clock/data logic 72 to provide data thereto for insertion in the appropriate time slots of the control signal produced thereby. The latter data is utilized to reset certain utilization controls 30.

Figure 3:
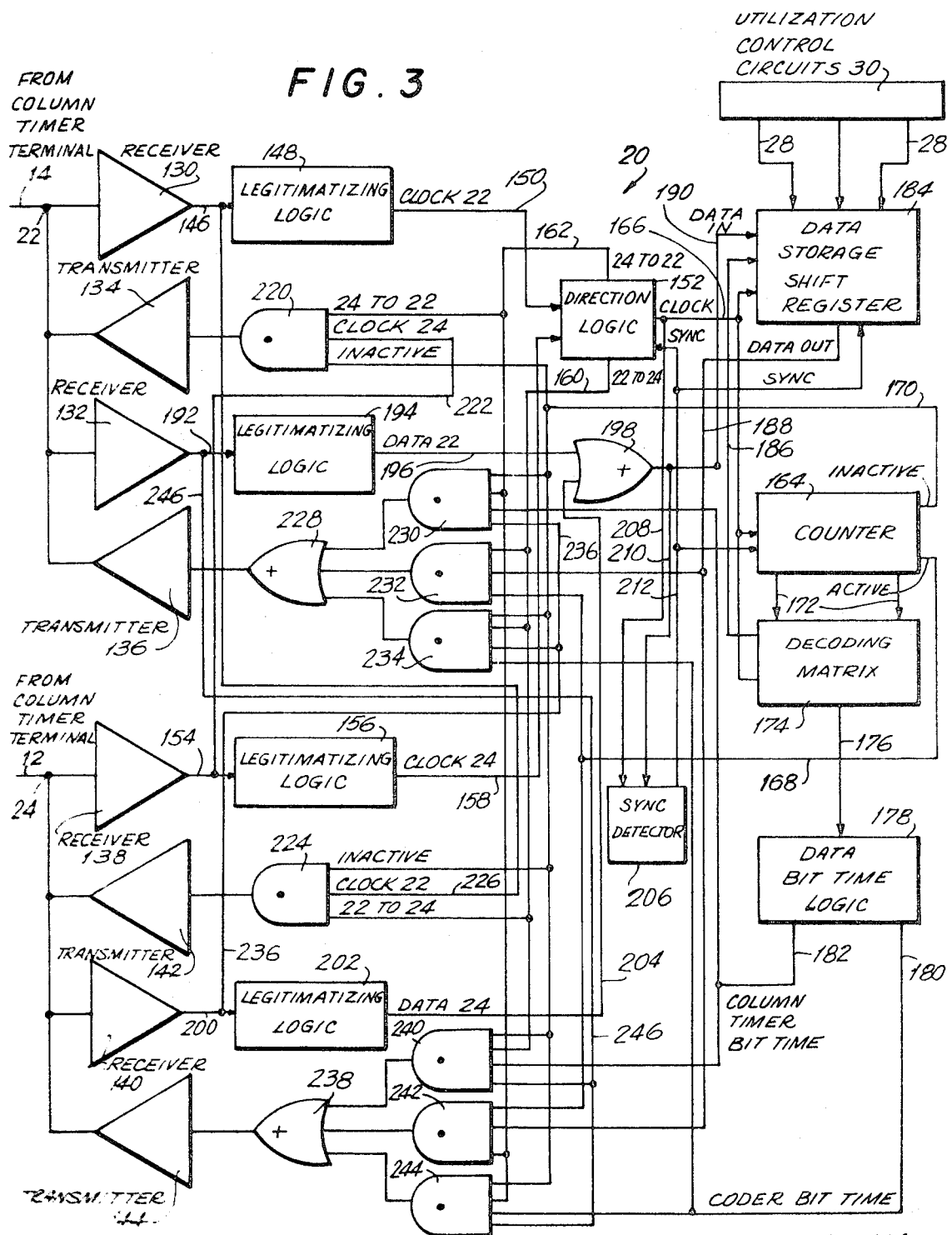
FIG. 3 is a schematic representation of the coder of the system of FIG. 1.

Turning now to FIG. 3, one embodiment of a coder 20 according to the invention is shown therein. As described above, the control signal can initially be applied to either terminal 22 or terminal 24. Connected to terminal 22 are a pair of receivers 130 and 132 and a pair of transmitters 134 and 136. In like manner, a pair of receivers 138 and 140 and a pair of transmitters 142 and 144 are connected to terminal 24. The output of receiver 130, which contains the signal applied to terminal 22, is applied along line 146 to legitimatizing logic 148 adapted to distinguish between the clock timing portions of the control signal and noise and other spurious signals and to pass along line 150 to direction logic 152 the clock timing portion of said control signal. In like manner, receiver 138 passes along line 154 the control signal, when received, to legitimatizing logic 156, which in turn, passes the clock timing component of a signal from terminal 24 to direction logic 152 along line 158. Said directional logic is adapted to produce a gating signal along lines 160 and 162 representative, respectively, of whether the control terminal was first applied at terminal 22 or terminal 24.

Each coder 20 is provided with an internal counter 164 for providing internal timing for said coder. The clock timing portions of the control signals applied to the coder are passed from direction logic 152 to counter 164 along line 166 for the sequential operation thereof. The output of counter 164 consists of gating signals representative of the active and inactive states of the coder which are passed respectively along lines 168 and 170. When the clock signal is first received, the active period is commenced and the signal is passed along line 168. After the allotted time period during which the coder performs its assigned task is completed, the signal is passed along line 170 to signify the inactive state. A further output from counter 164 is along lines 172 to decoding matrix 174 which produces the operative timing signals for the operation of the system, and which also receives the applied clock timing signals from direction logic 152 along line 166.

One output of decoding matrix 174 is along line 176 to data bit time logic 178 which produces gating signals in the time slots assigned for the transmission of data. Thus, gating signals are transmitted along line 180 during the time slots assigned to the transmission of data by the coder while gating signals are applied along line 182 during the time slots assigned to the transmission of data by the column timer 10 for the purposes of resetting certain utilization controls 30.

Utilization control circuits 30 are connected along lines 28 to data storage and shift register 184 adapted to detect the state of said utilization control circuits and store data representative of said states. Further, said data storage and shift register is adapted to transmit, in appropriate time slots, said data. Data storage and shift register 184 receives timing signals from deciding matrix 174 along line 186 and receives the clock timing components of the control signal from direction logic 152 along line 166. Data is transmitted out of said data storage and shift register along line 188. Certain data, namely the data from the column timer is received by said data storage and shift register from line 190. In this connection, receiver 132 connected to terminal 22 receives the signal applied thereto and passes it through line 192 to legitimatizing logic 194. Said legitimatizing logic is adapted to distinguish between data components of the received signal and noise and other spurious signals and to transmit said data components along line 194 to OR gate 198. In like manner, receiver 140 receives the signal from terminal 24 and applies said signal through line 200 to legitimatizing logic 202 which applies the data components thereof along line 204 to OR gate 198. The output of said OR gate is passed along line 190 to data storage and shift register 184.

In order to detect the synchronization portion of the control signal, synchronization detector 206 taps off lines 166 and 190, by means of lines 208 and 210 respectively for the purposes of detecting the presence of signals on these lines. In the embodiment shown in the drawings, the absence of a signal for a predetermined period of time would indicate synchronization and result in the transmission of a reset signal along line 212 from sync detector 206 to direction logic 152, data storage and shift register 184 and counter 164.

The operation of the coder is governed by a group of gates connected to the transmitters which determine the routing of the various data and control signals in response to the above-mentioned gating signals. Specifically, AND gate 220 is connected to transmitter 134 and adapted to transmit the clock signal received from terminal 24 as applied along line 222, which taps line 154, when the coder is in the inactive state. The control signal may be received from terminal 22, and a like AND gate 224 is connected to transmitter 142. AND gate 224 transmits the clock timing component of the control signal received from terminal 22 along line 226, which taps line 192. AND gates 220 and 224 are gated into operation by the direction gating signals from direction logic 152 and the state gating signals from counter 164.

Transmitter 136 is driven by OR gate 228 which is activated by any one of AND gates 230, 232 and 234. AND gate 230 derives the signal that it transmits through transmitter 136 to terminal 122 from line 236 which taps off line 200, and therefore receives the signal from terminal 24. Said AND gate is gated open to transmit the signal received along line 236 when the control signal was first received at terminal 24 as determined in direction logic 152, during the inactive state as determined at counter 164, and during the time slots assigned for the transmission of column timer data as determined at data bit time logic 178. Accordingly, AND gate 230 is adapted to specifically transmit column timer data through the coder from terminal 24 to terminal 22 when said coder is in the inactive or passive state.

AND gate 232 is adapted to transmit to terminal 22 the data from data storage and shift register 184 received along line 188 when the control signal was originally applied to terminal 22 as determined by direction logic 152 and during the active state of the counter as determined by counter 164. This constitutes the only transmission during the active state. The data is transmitted to the column timer through the previously activated coders.

AND gate 234 transmits to terminal 22 date received from terminal 24 along line 236, which taps line 200. This AND gate is adapted to transmit data from terminal 24 to terminal 22 when the coder is in the inactive state as determined by counter 164, the control signal was originally applied to terminal 24 as determined by direction logic 152 and during time slots assigned to the transmission of coder data as determined by data bit time logic 178. In effect, AND gate 234 is used to transmit through the coder, all state data transmitted by other coders while in their active states.

The gating system of coder 20 is symmetrical to permit operation from either of terminals 22 and 24. Accordingly, OR gate 238 connected to transmitter 144 for applying a signal to terminal 24 corresponds to OR gate 228 and has connected thereto three AND gates 240, 242 and 244. AND gate 240 corresponds to AND gate 230 and transmits the column timer data received along line 246 which taps the line 192 to receive the data portion of the signal from terminal 22. AND gate 240 differs from AND gate 230 in that it is operative only when the control signal is first applied to terminal 22.

AND gate 242 corresponds to AND gate 232 and transmits, during the active state of the coder, the data transmitted by data storage and shift register 184, if the original control signal was received from terminal 24. Finally, AND gate 244 is similar to AND gate 234 and transmits, in a like manner, the coder data received from terminal 22 along line 246.

Figure 4:
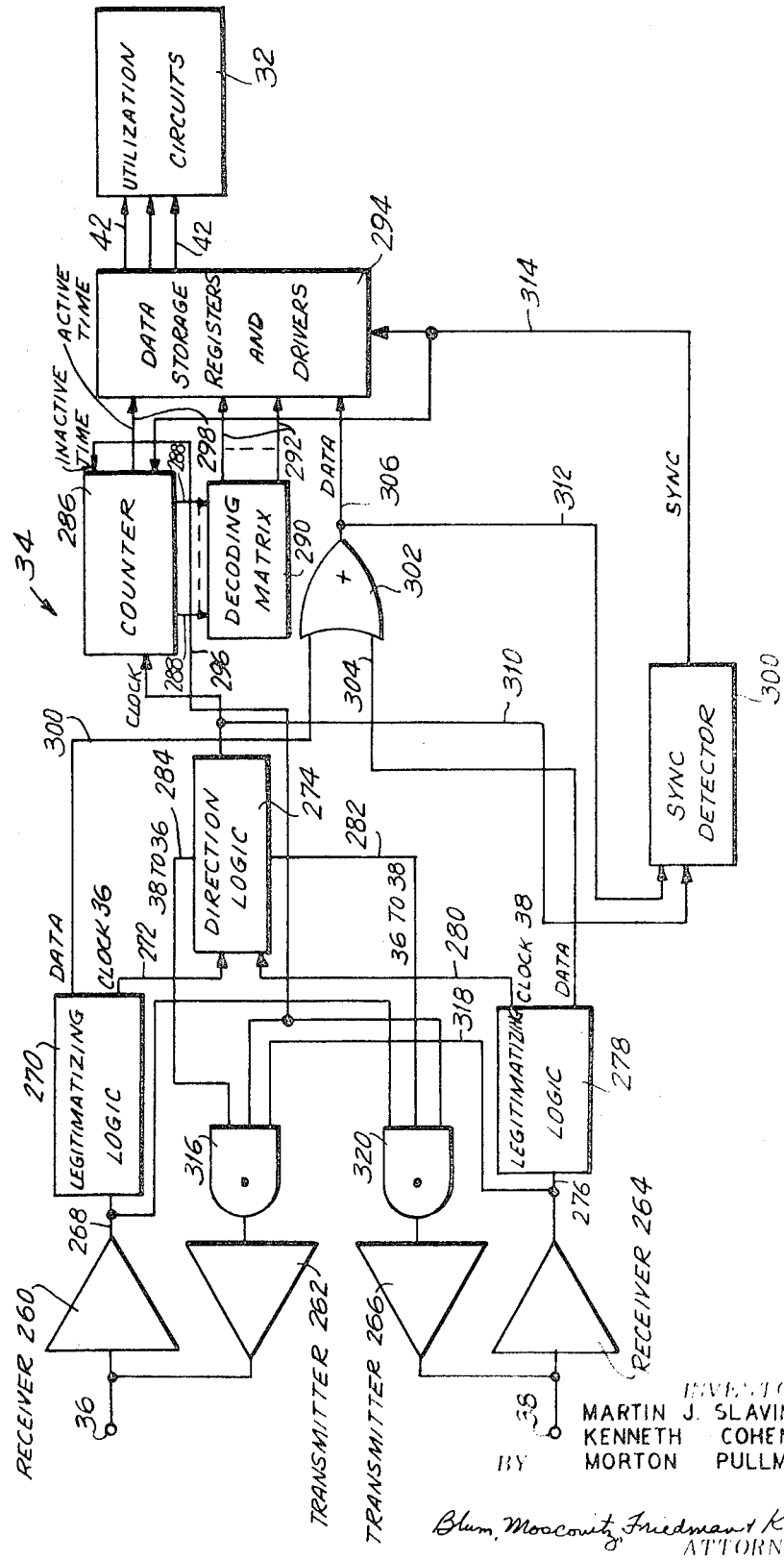
FIG. 4 is a schematic representation of the decoder of the system of FIG. 1.

Reference is now had to FIG. 4 which shows a detailed block diagram of a decoder 34 according to the invention. Said decoder operates on a similar principal as coder 20, but because it is required to perform fewer tasks, is of simpler construction. Specifically, receiver 260 and transmitter 262 are connected to terminal 36 while receiver 264 and transmitter 266 are connected to terminal 38. The output of receiver 260, which would consist of the control signal applied from column timer 10, is applied through line 268 to legitimatizing logic 270 which is adapted to differentiate between data and clock portions of said signal as well as to detect and reject noise and other spurious signals. The clock portion of said control signal is applied along line 272 to direction logic 274 which is of similar construction to direction logic 152 of coder 20. In like manner, the control signal from terminal 38 is applied through receiver 264 and line 276 to legitimatizing logic 278, which in turn applies through line 280 the clock timing portion of said signal to direction logic 274. Said direction logic produces gating signals along lines 282 and 284 representative of the receipt of said control signal at terminals 36 and 38 respectively. Decoder 34 is provided with a counter 286 which receives the clock signal from direction logic 274 for internal timing of the decoder. Said counter is connected along lines 288 to decoding matrix 290. Said decoding matrix produces and transmits along lines 292 to data storage registers and drivers 294 the timing signals necessary for the sequential operation of said data storage registers and drivers. Said data storage registers and drivers are connected along lines 42 to utilization circuits 32 and are adapted to dispose said utilization circuits in the states indicated by the data stored therein. Counter 286 is adapted to produce gating signals representative of the periods during which said decoder is to be disposed in the inactive and active states. The initial active state period is represented by a gating signal along lines 298 to data storage registers and drivers 294 to place same in operative condition for the control of its associated utilization circuits. The inactive state gating signal is applied along line 296. The data component of the signal passed by legitimatizing logic 270 is transmitted along line 300 to OR gate 302. In like manner, the data component of the signal received from terminal 38 is passed by legitimatizing logic 278 along line 304 to OR gate 302. Said OR gate passes said data signal along line 306 to data storage registers and drivers for storage and operation thereby when activated by a gating signal along line 298.

Decoder 10 is provided with a synchronization detector 308 which taps the clock and data outputs of direction logic 274 and OR gate 302 by means of lines 310 and 312 respectively. Upon detecting the synchronization component of the control signal, preferably by the absence of any data or clock signals for a predetermined period, a synchronization signal is passed by synchronization detector 308 along line 314 to data storage registers and drivers 294 and counter 286. In this manner, the decoder is reset for the next cycle.

Decoder 10 is required to transmit signals therethrough only when disposed in the inactive state, in which case it passes the control signals from the column timer to the decoder in the active state. AND gate 316 is adapted to transmit to terminal 36 through transmitter 262 the signal received from terminal 38. For this purpose, line 318 taps line 276 and transmits the signal from terminal 38 to AND gate 316. Said AND gate is adapted to pass a signal only when said decoder is in an inactive stage as determined by counter 286 and the control signal was first received at terminal 38 as determined by direction logic 274. In like manner, AND gate 320 will pass the control signal from terminal 36 through transmitter 266 to terminal 38 when the decoder is in the inactive state and the control signal was first applied to terminal 36. The signal is applied to AND gate 320 through line 322 which taps line 268.

The specific construction of the coders and decoders permits the closed-loop control system to operate in both directions along said loop so that, in the event of a break in said loop, coders and decoders on both sides of said loop would remain operative. Further, this construction permits the coders to be identical among themselves since the timing and sequential operation of the system is dependent, not on the unique characteristic of each coder, but on the position of the coder in the series connection. The same is true for the decoders which may be interchangeable among themselves.

This arrangement offers substantial advantages both in terms of ease of maintenance, and total cost for the system.

The coder and decoder devices according to the invention are not limited in their application to the system according to the invention, but rather, may be utilized as control elements where each of a group of series connected elements are to be sequentially activated for the purposes of receiving or transmitting data.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What we claim is:

1. A closed-loop control system for a plurality of discrete stations comprising a plurality of utilization circuits; at least one utilization control means disposed at each of said stations and associated with at least one of said utilization circuits; a plurality of series connected coder means for detecting the state of the utilization control means associated therewith; decoder means associated with each of said coder means for controlling the state of the corresponding utilization circuits, said decoder means being in series connection in the same sequence as said corresponding coder means; column timer means in series connection with said plurality of coder means and said plurality of decoder means for applying control signals to said series connections, said coder and decoder means being sequentially activated in response to said control signals during assigned time slots, each of said coder means being adapted, when first activated during a cycle of said system, to transmit in assigned time slots data representative of the state of the utilization control means associated therewith to said column timer means through any of said coder means previously activated during said cycle, said coder means being adapted to thereafter for the balance of said cycle to pass the control signal and the data transmitted by downstream coder means; said column timer means being adapted to incorporate in the control signal applied to said decoder means the data representative of said utilization control means states; each of said decoder means being adapted, when first activated during a cycle of said system, to receive during assigned time slots said data from said column timer means through any previously activated decoder means to control the corresponding utilization circuits, said decoder means being adapted to thereafter for the balance of said cycle pass the control signal to downstream decoders, whereby each of said utilization circuits is placed in a state responsive to the state of its corresponding utilization control means.

2. A closed-loop control system as recited in claim 1, wherein said column timer means is adapted to produce control signals incorporating a synchronization portion in each cycle of said system, said coder and decoder means being adapted to be reset in response to said synchronization portion to commence a new cycle of said system.

3. A closed-loop control system as recited in claim 1, wherein said column timer means includes a pair of coder and a pair of decoder terminals for series connection, respectively, with said coder and decoder means, said column timer means being adapted to apply said control signal to one of said coder terminals and one of said decoder terminals during some cycles of said system and to the other of said coder terminals and the other of said decoder terminals during other cycles of said system, said coder and decoder means being operative in response to control signals received in either direction along said respective series connections.

4. A closed-loop control system as recited in claim 3, wherein said column timer means includes loop error detector means connected to said column timer coder and decoder terminals adapted to detect a characteristic portion of said control signals from the last activated of said series connected coder and decoder means; and alarm means connected to said loop error detector means, said loop error detector means being adapted to activate said alarm means upon the failure to detect said characteristic portion of said control signals.

5. A closed-loop control system as recited in claim 1, wherein said column timer means is adapted to produce control signals including clock timing components in assigned time slots, the sequential operation of said system being responsive to said clock timing components.

6. A closed-loop control system as recited in claim 1, wherein said coder means are substantially identical, and said decoder means are substantially identical.

7. A closed-loop control system as recited in claim 1, including supervisory utilization control means connected to said column timer means and associated with at least one of said utilization circuits, said column timer means being adapted to detect the state of said supervisory utilization control means and to incorporate in the time slots of the control signal applied to said decoder means data representative of said supervisory utilization control means states for the control of said utilization circuits by the corresponding decoder means, said data being applied in place of the data transmitted by the coder means associated with said utilization circuits.

8. A closed-loop control system as recited in claim 1, wherein said coder means are adapted to establish the state of at least one utilization control means associated therewith, said system including supervisory utilization control means associated with said controllable utilization control means, said column timer means being adapted to detect the state of said supervisory utilization control means and to incorporate in assigned time slots of the control signal applied to said series connected coder means data representative of the state of said supervisory utilization control means, each of said coder means being adapted to receive such data when first activated for controlling the state of said controllable utilization control means.

9. A closed-loop control system as recited in claim 3, wherein said column timer means is adapted to produce a control signal for application to said series connected coder means including synchronization and clock timing components, the sequential operation of said coder means between a first not-yet-activated state, a second active state and a third inactive state being in response to said clock timing components during each cycle of said system, said coder means being adapted to be reset to said not-yet-activated state in response to said synchronization component.

10. A closed-loop control system as recited in claim 9, wherein said coder means includes a pair of terminals for said series connection; direction logic means connected to said terminals for producing a direction signal representative of the terminal from which said control signal is received; data storage means for storing data representative of the state of the corresponding utilization control means; gate signal means for generating, in response to said clock timing components of said control signal applied thereto during said active and inactive states of said coder means, gating signals representative respectively of said inactive state, active state, and the time slots assigned to the transmission of data; and gating means responsive to said gating and direction signals, said gating means being connected to the terminal at which said control signal is received to apply to said terminal, during said active state, the data stored in said data storage means and, during the time slots assigned to the transmission of data occurring during said inactive state, the data received from the other of said terminals, said gating means being connected to the other of said terminals, for the application thereto, during said inactive state, of the clock timing components of said control signal.

11. A closed-loop control system as recited in claim 10, wherein said control signal includes data transmitted by said column timer means in assigned time slots, said data storage means being connected to said terminals to receive such data during assigned time frames, said gating signal means producing gating signals representative of the time slots assigned to said data transmitted by said column timer, said gating means, during said time slots assigned to said column timer data occurring during said inactive state, applying said column timer data to said other terminal.

12. A closed-loop control system as recited in claim 9, wherein said decoder means includes a pair of terminals for said series connection; direction logic means connected to said terminals for producing a direction signal representative of the terminal to which said control signal is applied; data storage means connected to said terminals for detecting data components of said control signal during assigned time slots; gating signal means for producing gating signals representative of said active and inactive states respectively in response to the clock timing components of said control signal; and gating means responsive to said direction and gating signals for applying, during said inactive state, said control signal to the terminal to which said control signal was not applied.

13. A control element for series connection with a plurality of like elements in a closed loop, said closed loop having, at one point in said loop, a control signal applied in either direction along said loop for the sequential transmission during assigned time slots of operative data by said control elements, said control element comprising a pair of terminals for said series connection; direction logic means connected to said terminals for producing a direction signal representative of the terminal from which said control signal is received; data storage means for storing operative data; said control signal including synchronization and clock timing components, the sequential operation of said control element between a first not-yet-activated state, a second active state and a third inactive state being in response to said clock timing components during each cycle of said loop, said control element being adapted to be reset to said not-yet-activated state in response to said synchronization component, gate signal means for generating, in response to said clock timing components of said control signal applied thereto during said active and inactive states of said control element, gating signals representative respectively of said inactive state, active state, and the time slots assigned to the transmission of said operative data; and gating means responsive to said gating and direction signals, said gating means being connected to the terminal at which said control signal is received to apply to said terminal, during said active state, the operative data stored in said data storage means and, during the time slots assigned to the transmission of such data occurring during said inactive state, the data received from the other of said terminals, said gating means being connected to the other of said terminals, for the application thereto, during said inactive state, of the clock timing components of said control signal.

14. A control element as recited in claim 13, wherein said control signal includes operative data in assigned time slots, said data storage means being connected to said terminals to receive such control signal operative data during assigned time frames, said gating signal means producing gating signals representative of the time slots assigned to said control signal operative data, said gating means, during said time slots assigned to said control signal operative data occurring during said inactive state, applying said control signal operative data to said other terminal.

15. A control element for series connection with a plurality of like elements in a closed loop, said closed loop having at one point in said loop a control signal applied in either direction along said loop for the sequential receipt during assigned time slots of operative data in said control signal by said control elements, said control element comprising a pair of terminals for said series connection; direction logic means connected to said terminals for producing a direction signal representative of the terminal to which said control signal is applied; data storage means connected to said terminals for receiving operative data components of said control signal during assigned time slots; said control signal means including synchronization and clock timing components, the sequential operation of said control element between a first not-yet-activated state, a second active state and a third inactive state being in response to said clock timing components during each cycle of said loop, said control element being adapted to be reset to said not-yet-activated state in response to said synchronization component, gating signal means for producing gating signals representative of said active and inactive states respectively in response to the clock timing components of said control signal; and gating means responsive to said direction and gating signals for applying, during said inactive state, said control signal to the terminal to which said control signal was not applied.